May 20, 1969  A. L. FREEDLANDER ET AL  3,444,675
BLADE FOR MOWING
Filed Feb. 19, 1968
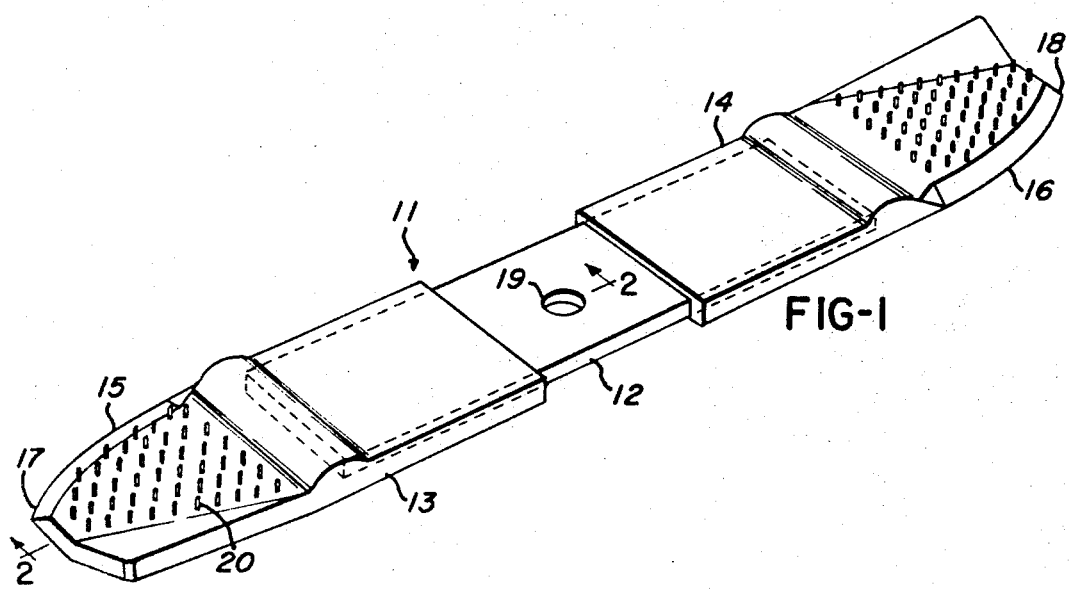
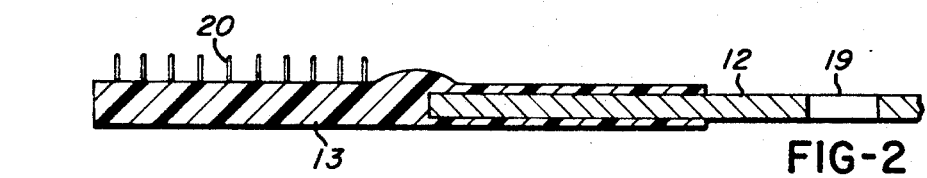
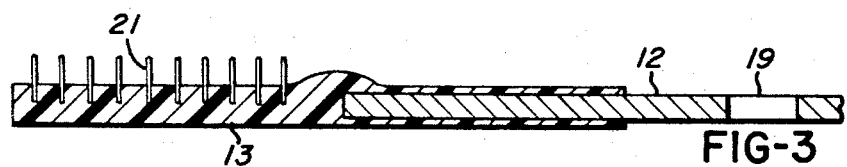
INVENTORS
ABRAHAM L. FREEDLANDER
ROBERT E. MATTHEWS
WAYNE C. GARRETT
BY
*Reuben Wolf*
ATTORNEY

United States Patent Office 3,444,675
Patented May 20, 1969

3,444,675
BLADE FOR MOWING
Abraham L. Freedlander, Dayton, Ohio, and Robert E. Matthews and Wayne C. Garrett, Waynesville, N.C., assignors to Dayco Corporation, Dayton, Ohio, a corporation of Delaware
Filed Feb. 19, 1968, Ser. No. 706,376
Int. Cl. A01d 55/18
U.S. Cl. 56—295                     3 Claims

ABSTRACT OF THE DISCLOSURE

A flexible blade for mowing primarily formed of an elastomeric material and having a rigid metal or plastic central mounting plate within the blade for mounting to the lawn mower shaft. Flexible bristles are located on the upper surface of the blade near the cutting edges to assist in absorbing the impact of stones.

---

Conventional lawn mowers used by the average homeowner are usualy rotary and are gasoline or electric motor operated. This type of mower is also popular for industrial mowing operations. The term "rotary" refers to a mower in which the shaft extends vertically downward from the housing and upon which the blade is mounted so that it rotates in a plane parallel to the ground. This type of mower is popular because it is simple to operate, inexpensive to build, and performs a highly satisfactory job of cutting grass and weeds. Unfortunately, however, the extremely high speeds at which such mowers operate, up to 3600 r.p.m., cause the blades to create extremely high hazards. For example, there have been many cases known where the operator's foot has accidentally slipped under the housing and has been struck by the rotating blade, causing serious injury to, and even amputation of, the foot. In addition, the conventional metal cutting blade may strike large rocks, posts, or other objects in the lawn, and the sudden shock may cause the blade to break, hurling pieces of metal at tremendous speeds to cause injury to the operator or to the persons close by. In the case of loose stones and other obstructions, these objects are also often struck by a rigid metal blade and caused to be thrown great distances to create damage to persons or property. A further disadvantage of the conventional metal blade used in the rotary mower is that it becomes dull very quickly and must be resharpened for proper efficiency.

The present invention is designed to overcome the many disadvantages recited above, while at the same time retaining the advantages of the rotary type blade. The invention utilizes a blade having arms somewhat similar to those of a metal blade, but made of an elastomeric material that is sufficiently rigid to cut grass as efficiently as a metal blade, and yet sufficiently flexible to permit the blade to flex when striking an object such as a shoe. This flexing action permits the blade to ride over the object and thus avoid serious damage to the foot. This flexing is also useful if an immovable object, such as a large rock or post, is encountered, since the blade is still permitted to flex and ride over this object; at the same time, the blade has a certain amount of inherent elasticity that tends to cushion the initial shock and prevent the blade from breaking. In the case of small rocks, etc. the flexing action will somewhat cushion the initial impact and reduce the amount of speed at which these small objects are hurled. The novel blade also has the property of being able to flex repeatedly without destroying any of its properties, and also retains a cutting edge a remarkably long time. The material utilized also has the properties of elongating only a very small amount during operation and yet has sufficient elastic memory to return to its original size despite many hours of use. Despite the fact that it is elastomeric, the blade itself does not become softer during operation, but retains its initial properties that provide an excellent compromise between sufficient rigidity for cutting and sufficient flexibility for safety. The blade is also extremely simple to manufacture and very low in cost.

In our copending application Ser. No. 625,802, filed Mar. 24, 1967, we have described a blade made primarily of a urethane elastomer, but having a rigid central mounting plate embedded within the elastomer for mounting the blade upon the drive shaft. The present invention represents an improved form of blade in which flexible bristles are placed on the upper surface of the blade near the cutting area, in order to help absorb the impact of the blade on loose stones and other obstructions, as mentioned above. As indicated in the above-mentioned application, the central plate provides an improved mounting member which eliminates separate members that would otherwise be required. But in addition, the rigid central plate tends to reduce the elongation of the elastomeric material, controls the twisting torque of the cutting area, and also affects the up and down deflection of the tips.

The specific embodiments of the invention are described in the following specification and claims, and illustrated in the drawings, in which:

FIGURE 1 is a perspective view of a novel blade.

FIGURE 2 is a cross-sectional view of the blade taken along line 2—2 of FIGURE 1.

FIGURE 3 is a view similar to FIGURE 2 illustrating a modified form of the blade.

Referring to the drawings, FIGURE 1 illustrates a lawn mower blade 11 which is generally flat and rectangular and has outwardly extending arms 13 and 14 having cutting edges 15 and 16 at their extremities. The tips of the blades are rounded at 17 and 18. The arms are made of an elastomer, and preferably of a urethane elastomer such as more fully described in our copending application referred to above, of the type which may be molded or cast and formulated from a polyester or polyether based isocyanate terminated prepolymer. Mounted within the central portion of the blade is a rigid central mounting plate 12 which may be made of a metal or of a rigid plastic material such as nylon, polycarbonate, polystyrene, polyacetal, or the like. As shown in the drawings, this plate 12 is at least partially embedded within the arms and forms a central mounting member, the central section of the plate being exposed. An aperture 19 in the center of the plate permits mounting on the shaft of a lawn mower and the use of the appropriate hardware for mounting. The aperture may be made with a diameter which is required to fit the smallest of the lawn mowers on the market, so that it is only necessary for the user to drill this hole out to a larger diameter if required for his particular mower. The plate which is illustrated provides a solid mounting member on the blade.

Mounted on the upper surface of the blade near the cutting edges is a series of flexible bristles 20. As illustrated in FIGURE 2, these bristles are formed of the same elastomer as the principal portion of the blade, and are cast or molded in the same operation which forms the blade. These bristles are integral with the upper surface, and are about ¼ inch long. The bristles are very fine, ranging from about 0.01 to 0.10 inch in diameter.

FIGURE 3 illustrates a modified form of the invention in which the bristles 21 may be inserted within the body of the blade, either by cementing them in place or placing them within the body before the elastomer is cured. These bristles may also be made of a urethane elastomer or of less expensive flexible plastic materials such as polyethylene, polypropylene or polyacetal. These bristles also extend above the surface about ¼ inch.

When the rotating blade strikes stones, rocks, or other such objects, there is some tendency for the blade to cushion the impact because of the inherent flexibility of the blade. The bristles enhance this tendency, so that much of the impact is cushioned and the stones are not hurled as far or as fast as they might otherwise be.

Other modifications are contemplated as falling within the scope of the invention.

We claim:

1. In a lawn mower having a rotatable shaft and a cutting blade mounted thereon, said blade including outwardly extending arms having integral cutting edges of a flexible elastomer, a rigid central mounting plate extending outwardly into said arms and terminating inwardly of said cutting edges, and a plurality of bristles located on and extending upwardly from the upper surface of said arms near said cutting edges.

2. The blade of claim 1 in which said bristles are made of the same material as said cutting edges.

3. The blade of claim 1 in which said bristles are made of a flexible plastic material.

References Cited

UNITED STATES PATENTS

| | | | |
|---|---|---|---|
| 2,473,665 | 6/1949 | Van Nort | 170—159 |
| 3,320,732 | 5/1967 | Kirk | 56—295 |
| 3,340,682 | 9/1967 | Ely | 56—295 |

ANTONIO F. GUIDA, *Primary Examiner.*

P. A. RAZZANO, *Assistant Examiner.*